March 6, 1973  G. C. P. WINDSOR  3,719,378
PULL-PROOF CONTROL KNOB
Filed Aug. 3, 1971
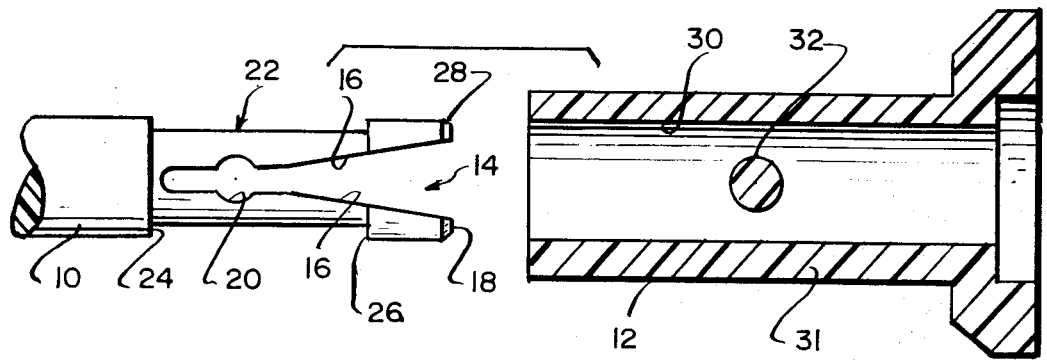
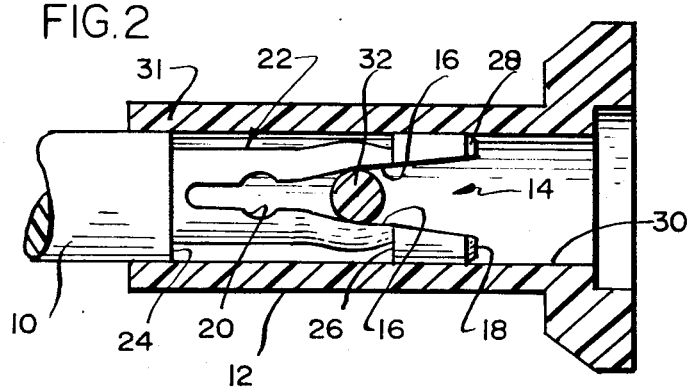
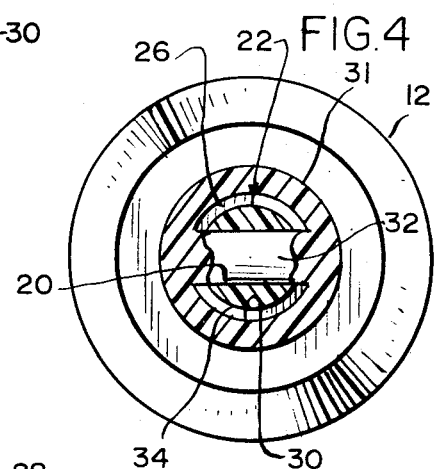
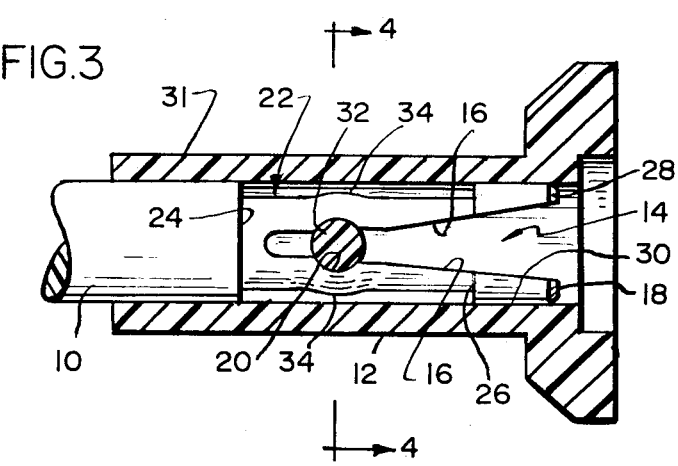
INVENTOR.
GEORGE C.P. WINDSOR
BY Hofgren, Wegner, Allen,
Stellman & McCord.
ATTORNEYS.

3,719,378
PULL-PROOF CONTROL KNOB
George C. P. Windsor, Oak Park, Ill., assignor to Warwick Electronics Inc.
Filed Aug. 3, 1971, Ser. No. 168,664
Int. Cl. F16d *1/06*
U.S. Cl. 287—53 H          2 Claims

ABSTRACT OF THE DISCLOSURE

A knob to shaft coupling including a resilient shaft having a cutout and an elongated recess in a side thereof extending to either side of the cutout. A diagonal guideway extends from one end of the shaft toward the cutout and a knob having a bore with a projection therein may be received on the shaft in such a way that contact of the projection with the diagonal surface will deflect the recessed portion of the shaft to permit the projection to enter the cutout whereupon the resilience of the shaft will firmly hold the projection in the cutout to establish a coupling between the knob and the shaft.

BACKGROUND OF THE INVENTION

This invention relates to knob to shaft couplings particularly suited for employment with push-pull or push-pull-rotating control devices.

Over the years, a number of constructions for securing control knobs to shafts have evolved. In simple rotatable controls, spline arrangements have been used but with the increasing use of push-pull controls or combination push-pull and rotatable controls, the previous constructions employed with solely rotatable controls became unsuitable in that an operator of the control employing the same would frequently pull the knob off of the shaft.

As a result, other constructions evolved wherein a knob was not only keyed to the shaft against rotation of one relative to the other, but against longitudinal relative movement so that the knob could not easily be pulled off the shaft. Many such constructions were satisfactory for their intended purpose but by reason of inclusion of parts such as springs, retaining clips, mounting pins, etc., the same did not economically lend themselves to mass production techniques. And force fit constructions were unsatisfactory by reason of reliance upon a force fit that would no longer operate if the knob had to be removed from the shaft a number of times, as for example, to facilitate the maintenance of the equipment; or if made of plastic, cold flow would result in the loss of retaining force over an extended period of time.

SUMMARY OF THE INVENTION

It is the principal object of the invention to provide a new and improved knob to shaft coupling that is particularly suited for use with push-pull or push-pull-rotating control devices. More particularly, it is the object of the invention to provide such a coupling that is inexpensive to produce, requires no more parts than the shaft and the knob itself, and does not rely on relatively ineffective force fit techniques heretofore employed; and nonetheless provides positive retaining action during normal use to preclude rotation of the knob relative to the shaft or longitudinal movement of the knob relative to the shaft.

The exemplary embodiment of the invention achieves the foregoing objects by means of a construction employing a resilient, bifurcated shaft. The bifurcation diverges outwardly toward one end of the shaft and includes, intermediate its ends, a cutout portion for receipt of a projection in a bore of a knob. The shaft is further provided with a circumferential recess extending from about the innermost end of the bifurcation to a point adjacent the shaft end that overlaps the diverging portion of the bifurcation. Thus, when the knob is slipped on the shaft, the projection will engage the diverging portion of the bifurcation to deflect the recessed portion of the shaft outwardly, although within the confines of the knob bore until the projection is received in the cutout whereupon the resilience of the shaft will cause the same to return to its original shape to firmly grasp the projection and hold the knob in place.

Other objects and advantages of the invention will become apparent from the following specification taken in conjunction with the accompanying drawings.

DESCRIPTION OF THE DRAWINGS

FIG. 1 is an exploded view of one embodiment of a coupling made according to the invention with parts shown in section;

FIG. 2 is a partially assembled view of the embodiment illustrated in FIG. 1 with parts shown in section;

FIG. 3 is a fully assembled view of the embodiment of FIG. 1 with parts shown in section; and FIG. 4 is a sectional view taken along the line 4—4 of FIG. 3.

DESCRIPTION OF THE PREFERRED EMBODIMENT

An exemplary embodiment of a knob to shaft coupling is illustrated in FIGS. 1–4 and is seen to consist of a resilient shaft 10 formed of any suitable material, as for example, nylon and a knob 12. The shaft 10 includes a bifurcation, generally designated 14, having a guideway or portion 16 diverging outwardly toward an end 18 of the shaft 10.

Inwardly of the diverging portion 16 but forwardly of the end of the bifurcation 14 is a cutout 20 which, according to the exemply embodiment, is cylindrical in shape. The shaft 10 also includes a peripheral recess, generally designated 22 having one end 24 located at approximately the end of the bifurcation 14 remote from the shaft end 18 and another end 26 adjacent the shaft end 18 and forwardly of the end of the diverging portion 16 nearest the cutout 20. Finally, the shaft end 18 may be provided with a chamfer 28

The knob 12 includes a central bore 30 in a shank 31 and having a projection 32 therein. According to the embodiment illustrated in FIGS. 1–4, the projection extends across the midpoint of the bore 30 and is cylindrical in shape. In addition, the radius of the projection 32 may be slightly larger, or at least of the same size as the radius of the cylindrical cutout 20. Moreover, the diameter of the projection 32 as well as the cutout 20 must be considered in conjunction with the distance across the outermost end of the bifurcation 14 such that the latter is greater than the diamter of the projection 32. Finally, the bore 30 may be nominally of the same size as the shaft 10.

To assemble the knob 12 to the shaft 10, the axes of the cylindrical cutout 20 and the cylindrical projection 32 are arranged in a generally parallel fashion and the knob 12 advanced over the shaft 10. As a result, the projection 32 will enter the diverging portion 16 of the bifurcation 14 and at some point engage the same to deflect the portion of the shaft recessed at 22 outwardly as illustrated in FIG. 2. It will be observed that such deflection is accommodated within the bore 30 by reason of the recess 22.

Further advancement of the knob on the shaft will result in the projection 32 entering the cutout 20 at which time, the shaft 10, and particularly the bifurcated end thereof, will return to substantially its original shape. If the projection 32 is of slightly greater diameter than the cutout 20, slight humps 34 may exist in the exterior of the recess 22 as illustrated in FIG. 3.

As a result, it will be appreciated that the knob 12 will be keyed to the shaft 10 not only against relative rotation, but against relative longitudinal movement as well. Thus, a coupling is established employing only a knob and a shaft and it will be further appreciated that while force is required to establish the connection, the elements are relatively unstressed after assembly so that any possibility of cold flow voiding the effectiveness of the connection is substantially avoided.

From the foregoing, it will be appreciated that the invention provides a reliable and positive knob to shaft coupling that is simple to construct and is durable, not deteriorating in time.

I claim:
1. A knob to shaft coupling comprising a bifurcated shaft formed of resilient plastic or the like, the bifurcation in said shaft diverging outwardly toward one end of said shaft and including an enlarged cutout intermediate its ends, said shaft having a generally cylindrical configuration; said shaft further including a recess encircling said shaft about and in a portion of its cylindrical surface and terminating in a cylindrical shaft bearing portion at each end of said recess and extending along the length of said shaft approximately from the end of said bifurcation opposite the shaft end to a point short of the shaft end and overlapping the diverging portion of said bifurcation; and a knob including a cylindrical bore sized to receive said shaft and an integral projection within said bore and extending thereacross and alignable with said cutout and the diverging portion of said bifurcation when said shaft is received in said bore, said projection being sized to be snugly received in said cutout and having a dimension transverse to the axis of said bore greater than that of said bifurcation adjacent said cutout; whereby when said shaft is received in said bore, said projection will force a portion of said shaft including the bottom wall of said recess outwardly until said projection is received in said cutout to establish a coupling between said knob and said shaft wherein the parts thereof are relatively unstressed to provide a long-lived effective, releasable connection.

2. A knob to shaft coupling comprising a shaft formed of a resilient material, said shaft including at one end an elongated slot having a portion diverging outwardly toward one end of said shaft and further having an enlarged cutout intermediate its ends, said shaft further including a recess encircling said shaft about and in its peripheral surface and terminating in axially extending shaft bearing portions of uniform diameter at each end of said recess, and said recess extending along the length of said shaft approximately from the end of said slot opposite the shaft end to a point short of the shaft end and overlapping the diverging portion of said slot; and a knob including a passage complementary to said bearing portions and sized to receive said shaft, said knob including an integral projection within said passage and extending thereinto and alignable with said cutout and the diverging portion of said slot when said shaft is received in said passage, said projection being sized to be snugly received in said cutout and having a dimension transverse to the axis of said passage greater than that of said slot adjacent said cutout; whereby when said shaft is received in said passage, said projection will force a portion of said shaft including the bottom wall of said recess outwardly until said projection is received in said cutout to establish a coupling between said knob and said shaft wherein the parts thereof are relatively unstressed to provide a long-lived, effective releasable connection.

References Cited
UNITED STATES PATENTS

| | | | |
|---|---|---|---|
| 745,679 | 12/1903 | Schulze | 287—124 UX |
| 2,683,268 | 7/1954 | Strayer | 85—8.8 X |
| 1,832,554 | 11/1931 | Holstein | 287—53 H |
| 3,193,312 | 7/1965 | Ehner | 287—53 H |

ANDREW V. KUNDRAT, Primary Examiner

U.S. Cl. X.R.
287—124